March 6, 1962  C. O. MOORE ET AL  3,023,798
NOISELESS TREAD PORTION FOR TIRE CASING
Filed Aug. 1, 1958  3 Sheets-Sheet 3

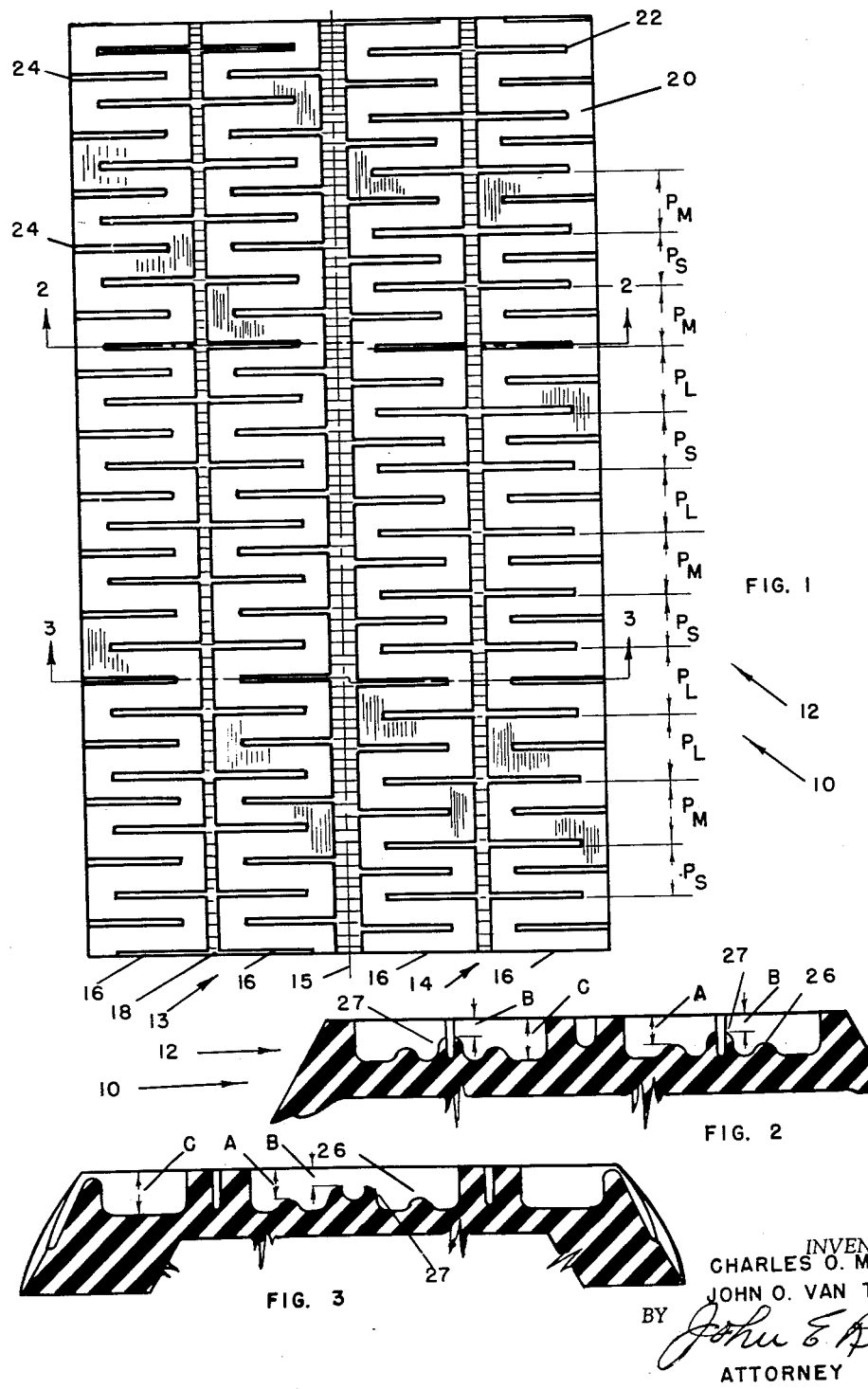

INVENTORS
CHARLES O. MOORE
JOHN O. VAN TASSEL
BY
ATTORNEY 3,023,798
Patented Mar. 6, 1962

3,023,798
NOISELESS TREAD PORTION FOR TIRE CASING
Charles O. Moore and John O. Van Tassel, Denver, Colo., assignors to The Gates Rubber Company, Denver, Colo., a corporation of Colorado
Filed Aug. 1, 1958, Ser. No. 752,525
13 Claims. (Cl. 152—209)

This invention relates to an improved tire tread construction and, in particular, relates to a tire tread design and construction to increase the over-all efficiency of the entire tire and to substantially reduce the noise-energy generated as the tire tread engages a road surface and the like.

In the design and construction of a tire tread, it has been recognized for some time that it is possible to attain substantial reduction in the noise-energy generated by the tire in operation by varying, in a number of ways, the pitch lengths of the tread design portions so as to prevent summation or build-up of the noise generated by the respective portions. For example, not only may each pitch length be varied, but also the sequential order of the respective pitch lengths may be varied. Moreover, the arrangement of the tread design portions across the tire may be staggered so that adjacent portions with the same or corresponding pitch frequency will not engage the surface of the road at the same given time, or in unison. Of course, factors other than noise reduction must be taken into consideration in designing the exterior configuration of the tread. In this connection, flexibility, ability to resist skidding, along with other favorable characteristics must be given to the tread design portions. Accordingly, and for this reason, it is often difficult to control the design of the tread portions throughout the length of the tire to obtain the desired noise reduction due to the other factors which must be considered, and also on account of the small size of each of the tread portions.

In the past, however, little or no recognition has been given to the generation of noise by the voids including any siping, blading and grooving or similar recess portions in the tire tread. This is especially true with reference to the depth of such voids; also the depth of these voids as they may affect the pitch frequencies generated by the tread design portions, nor the fact that void depth may be easily controlled without affecting the desired design and other characteristics of the tire tread. The importance of controlling the noise-energy generated in the voids will be realized when it is considered that any pitch frequencies or tones generated in the tire, whether they be differing tones or summation tones, may combine to produce a tone of greater amplitude than the individual tones, if not properly controlled; and, the combination tones may be of sufficient amplitude to become objectionable and even irritating to the human ear.

Accordingly, it is an object of the present invention to provide for a way of controlling the combination of pitch frequencies or tones generated in a tire so as to prevent the generation of objectionable noise.

It is another object to provide for an improved tire tread arrangement so constructed and arranged as to minimize the noise-energy generated by a tire without affecting the exterior configuration and design of the tire tread.

It is a further object to provide for a way of selectively varying the pitch length and void depth in the tread design portions of a tire in such a way as to avoid intensification and enrichment of the frequencies at which the tread design portions strike the road surfaces, so as to substantially reduce the noise-energy thereby generated.

It is still a further object to provide for an improved tire tread construction whereby the frequencies generated by one design portion, or group of design portions will not be additive with the pitch frequencies developed by other adjacent portions, so as to thereby minimize and restrict the noise produced to a level substantially below that which may be termed objectionable or irritating.

The above and other objects of the present invention may be accomplished preferably by controlling the size and depth of the voids, running between and across the tread design portions in the tire. Variation in void depth, of course, may be accomplished in a number of ways, e.g., by the formation of the mold design for the tire tread. And, as hereafter applied, the term void will be understood to include any recess portions, such as, sipes, grooves and the like formed in the tire tread.

It is, of course, recognized that it is not new to vary the siping or void depth across the width of the tire or along the length of the tire for various reasons. For instance, it has been proposed to vary the depth of the tread design portions so as to form hidden or intermediate portions which serve to retain some tread design in the tire after the exterior tread design portions have worn down, or to impart other desirable attributes to the tire such as flexibility and skid resistance in the various sections. However, to the best of our knowledge, it has never before been proposed to selectively vary the depth of the voids, either alone or in combination with the selective variation of the length of the tread design portions so as to serve the added function of reducing noise. And, in accordance with the present invention, it has been discovered that the noise-energy may be controlled not only by selecting the exterior surface configuration and sequence of tread design portions in direct engagement with the road surface, but also by controlling the depth of the design portions and the depth and configuration of the voids between the tread design portions and ribs. Moreover, it has been found that the depth and configuration of the voids, together with the length of the tread design portions, may be selectively varied together in size and sequence in a manner similar to that proposed for the tread design portions alone, so as to establish greatly increased noise reduction without in any way altering the desired design characteristic of the exterior tread portion of the tire. Also, it is thereby possible to vary the pitch frequencies of the voids in an almost unlimited number of ways, since they do not in any way contribute to the actual design of the tire tread portion itself.

These objects and advantages will become more apparent in the following detailed description, when considered in connection with the accompanying drawing, illustrating preferred embodiments of the present invention, in which:

FIGURE 1 is a fragmentary, plan view illustrating a portion of a preferred tire tread design to be employed in carrying out one mode of construction of the present invention.

FIGURE 2 is an enlarged sectional view on line 2—2 of FIGURE 1.

FIGURE 3 is an enlarged, sectional view taken on line 3—3 of FIGURE 1.

Figure 4:
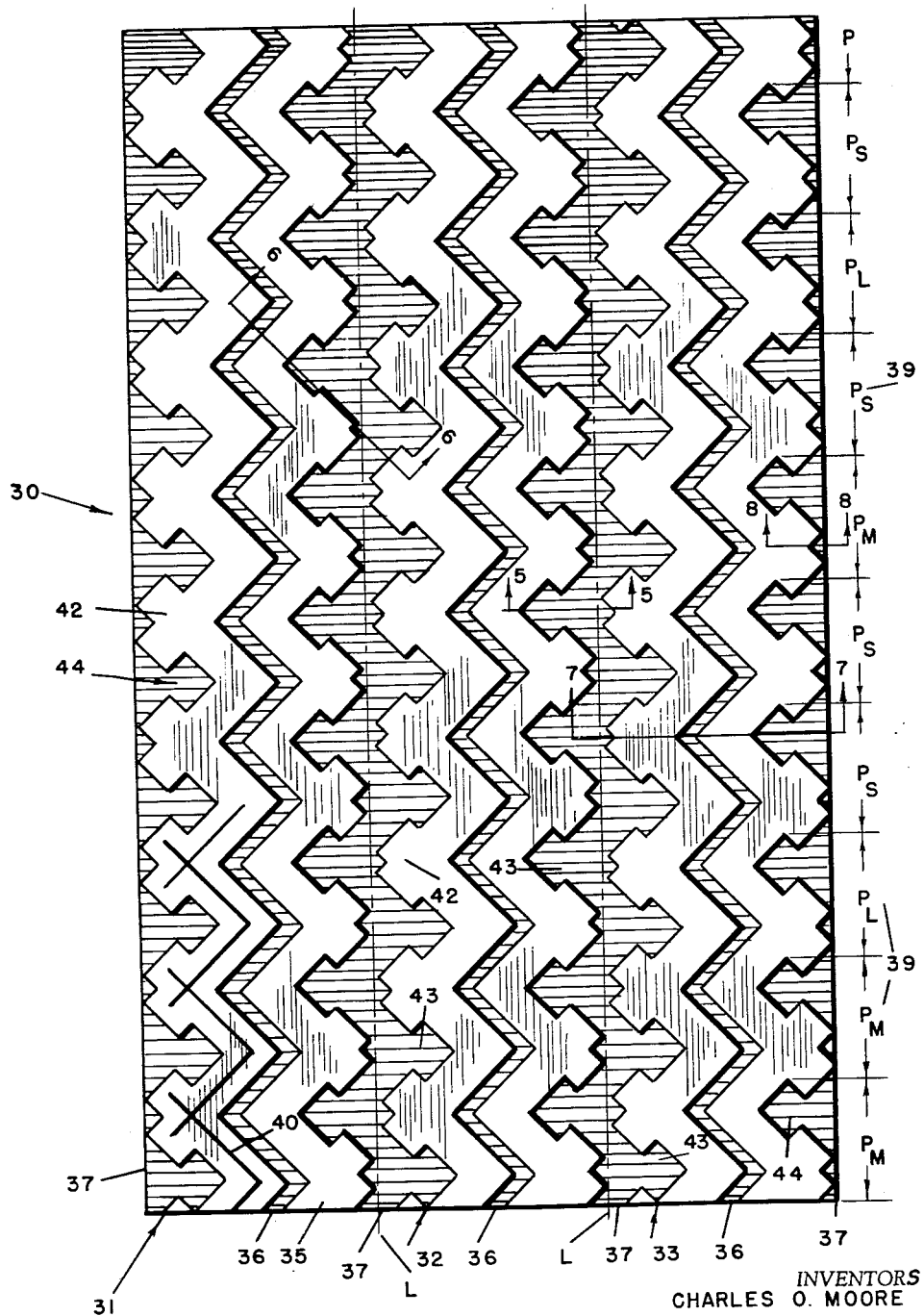
FIGURE 4 is a fragmentary, plan view of a modified form of tire tread construction which may be employed in carrying out another mode of construction, in accordance with the present invention.
Figure 6:
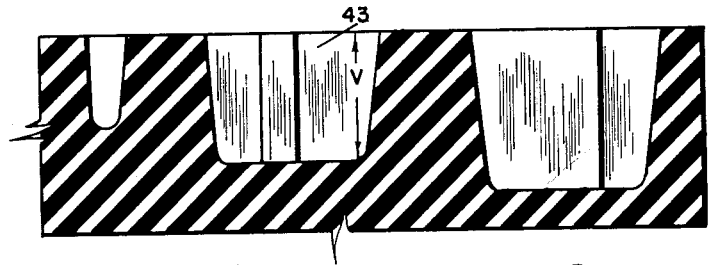
FIGURE 6 is another enlarged sectional view taken on line 6—6 of FIGURE 4.
Figure 5:
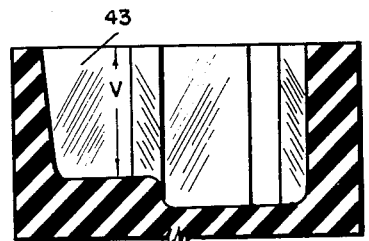
FIGURE 5 is an enlarged sectional view taken on line 5—5 of FIGURE 4.
Figure 7:
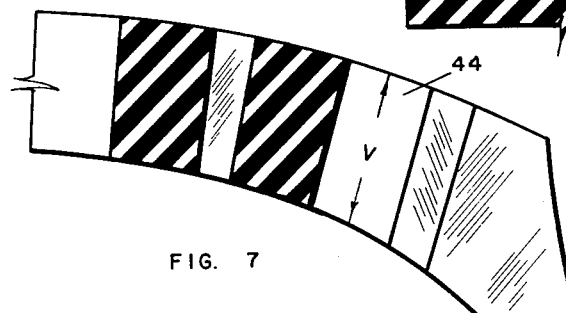
FIGURE 7 is a further enlarged, sectional view taken on line 7—7 of FIGURE 4.

With more particular reference to the drawings, there is illustrated by way of example and not limitation in FIGURES 1 to 3, inclusive, a tire tread construction embodying the principles of the present invention. A tire casing 10 may generally be formed of any of a wide variety of forms of construction well-known in the art; for instance, of a plurality of rubberized fabric or cord plies arranged in a number of layers to form the carcass of the tire and with an outer resilient or rubber-like tread portion 12 covering the carcass and being firmly adhered thereto. The road engaging surface or tread portion 12 may be comprised broadly of a number of longitudinal tread sections 13 and 14 which, in FIGURE 1, are shown divided by a medial, circumferentially extending groove 15. Each of the tread sections 13 and 14, in turn, may be divided into a plurality of circumferentially extending ribs 16, which in FIGURE 1 comprise a pair of ribs in each tread section extending circumferentially the length of the tire divided by a flanking or intermediate groove 18 extending the length of the tire.

In order to provide the desired operating characteristics in the tread portion of the tire, each of the ribs 16 is defined by a tread area separated or formed into a number of generally transverse individual design portions 20. In the preferred form as shown, each of the design portions 20 is defined by spacing in predetermined relation and perpendicular, or at some suitable angle, to the length of the flanking grooves 18 a plurality of transverse sipes or slots 22 extending across the grooves 18 and projecting for the greater width of each of the ribs 16. Additional transverse sipes 24 may also be extended across the greater width of the ribs from the opposite sides of the ribs 16 and spaced intermediately between each of the sipes 22, again with each portion between the sipes 22 forming the design portions 20.

In accordance with conventional practice, the design portions 20 may be varied in length along the length of each rib, as determined by the spacing between each of the transverse sipes 22; also, the sipes 22 and 24 themselves may be of any configuration such as curved, interlocking or other forms, and may either extend completely across the ribs or be terminated at a point short of juncture with the side of the ribs, as shown. For purposes of illustration, it will be noted that the tread portion may be divided throughout its length into a number of individual segments, FIGURE 1 representing one complete segment, in order to lay out the desired sequence of the pitch length of the individual design portions. For instance, the tread portion may be made preferably of six to eight segments; and in each segment, each of the design portions may be given any one of three basic pitch lengths, as designated $P_S$, $P_M$, and $P_L$, to represent "short," "medium," and "long." The pitch lengths of the design portions 20 in tread section 13 may therefore be varied in random sequence throughout each segment of the tire as will be noted alongside the left flanking rib of the segment shown in FIGURE 1. In addition, the pitch length of the design portions 20 forming the ribs 16 in the opposite tread section 14, may also be given the same pitch lengths but in a different sequence, yet still in random sequence, extending throughout the length of the segment. Therefore, the design portions opposing one another on either side of the groove 15 may have throughout each segment a different pitch length. In this way, the opposing pitch lengths will generate different pitch frequencies upon impact with the road surface which will not combine or be additive to produce a resultant frequency of greater amplitude than any individual frequency. This may be seen in the accompanying Table I, wherein it will be noted that the pitch lengths selected for $P_S$, $P_M$, and $P_L$, respectively, are not divisible by a common small whole number or divisible into one another; that is, are not multiples of a common number, and the resultant frequencies are not multiples of a common number thereby to prevent the development of resultant frequencies of greater amplitude than the individual frequencies:

TABLE I

| Size: | Pitch length in inches |
|---|---|
| Long | 0.5649 |
| Medium | 0.5000 |
| Short | 0.4721 |

Also, the design portions 20 in one tread section may be staggered in relation to the design portions in the other tread section so that the portions will not strike the road surface at the same time, but will make contact with the riding surface in an out-of-phase relationship.

A primary feature of the present invention is the construction and configuration of the voids including the sipes 22 and 24, together with the longitudinally extending grooves 15 and 18 so as to control, in addition, the pitch frequencies and especially the combination of frequencies, generated by the voids. In following the description of the sipe configuration and dimensions, it should be understood that the basic objective in designing each sipe is to control its depth so as to vary its pitch frequency and that in accordance with the present invention, this objective may be accomplished in a number of ways and is not to be limited to the particular configuration of the individual sipes as shown and illustrated. Basically, and for this purpose, there is shown in FIGURE 2 the depth configuration of a representative pair of the sipes 22. The whole depth in the sipes may be designated by the dimension C, and from the following Table II, the whole depth C may be varied in relationship to the particular pitch length of the design portion 20 with which it is associated. Accordingly, for $P_S$, the depth C may be relatively shallow and increased, as shown in the table, as the pitch length is increased so as to vary with the length of the portions. In this connection, it has been found that any combination between the depth C and the pitch lengths P may be selected so long as repetition of the resultant pitch frequency is avoided and in this way substantial decrease in noise energy is attained over previous methods wherein only the pitch length and pitch length sequence is varied without regard to the depth of the sipes. Moreover, it will be evident that the whole depth C of each of the sipes may be varied alone without resort to variation in the pitch length as in the preferred form of FIGURES 1 to 3, although increased reduction has been found possible by combining sipe-depth variation in combination with pitch length variation.

TABLE II

*Void-Depth Variations*

| Pitch length | Dimension (inches) | | |
|---|---|---|---|
| | A | B | C |
| Short | 0.205 | 0.105 | 0.320 |
| Medium | 0.230 | 0.125 | 0.345 |
| Long | 0.250 | 0.150 | 0.365 |

Additional unique ways of establishing a controlled variation in pitch frequencies throughout the length of the tire are illustrated in both FIGURES 2 and 3. Fillets 26 are commonly provided throughout the bottom of a sipe or groove for the purpose of reinforcement and to prevent cracking, and to retain some tread design after the exterior tread portions have become worn. To accomplish further reduction in the noise-energy generated, these fillets 26 may also be varied in extent of projection from the bottom of each sipe. Accordingly, the top surface of each fillet 26 will be at a variable and intermediate depth A, so as to vary the pitch frequency within each of the transverse sipes 22. In addition, fillets 27 may form central reinforcement members for each of the grooves 18 flanking each side of the medial groove 15. The depth of the fillets 27 from the surface of the tread portion may be given the dimension B and, as will be noted from Table II, will also vary in accordance with the pitch length of the particular design portion 20 with which it is associated. It will thus be evident that the depth throughout each sipe and between sipes may be varied in a number of ways to accomplish the desired opposing pitch frequency sequences. The grooves 15 and 18 may also be similarly varied in depth. And, moreover, each of the dimensions selected for the sipe depth and pitch length may be of a number so as to operate in combination to oppose one another and, depending upon the design or configuration desired in the tread portion, any of the dimensions above-described may be used either alone or in combination to accomplish the desired reduction in noise.

In order to illustrate the application of the present invention to various types of tread design, there is shown in FIGURES 4 to 8, inclusive, a tread configuration differing substantially from that illustrated in FIGURES 1 to 3, inclusive. Again, a tread portion 30 may be divided into a number of segments as mentioned with respect to the preferred form and each segment may be divided into a number of tread sections, in this case three sections 31, 32 and 33 which may, for purposes of illustration, be divided along the center lines L. Each tread section, in turn, may be made up of a pair of ribs 35 extending continuously in circumferential fashion throughout the length of the tire, separated by a groove 36 of saw tooth configuration which also extends continuously in circumferential fashion throughout the length thereof. Separating each pair of ribs 35 and bordering the outside of the flanking ribs are complementary voids 37 which may be given the same general exterior configuration as the ribs 35. Again, as in FIGURES 1 to 3, each of the tread sections may be divided into a predetermined number of design portions 39, each portion 39 defining a pitch length P and including a part of the ribs 35, central groove 36 and the voids 37 opposite the ribs in each portion and each portion may be given a predetermined pitch length which may be varied in random sequence throughout the length of each segment, then repeated throughout each of the segments. Again, the pitch lengths may be represented by $P_S$, $P_M$, and $P_L$. Additionally, and as before, each of the tread sections may be staggered so as to offset the impact of each of the design portions across the width of the tire as they strike or engage the riding surface. If desired, siping may also be provided as at 40 in the ribs for added flexibility and other characteristics and may, of course, be varied in depth as described in FIGURES 1 to 3.

From a consideration of one of the design portions 39, it may be seen that the ribs 35 are of a generally saw tooth configuration bordering the central groove 36, and on the opposite sides thereof are provided with enlarged head portions 42 formed by the corresponding diamond-shaped designs 43 and 44 extending from the voids 37 in each of the design portion sectors. To avoid the combination or enrichment of pitch frequencies between the void depth and pitch length, the pitch length sequence of the design portions 39 may be varied in random as mentioned. Moreover, the corresponding void depths may also be varied in random sequence, and selectively, in order to prevent addition with the pitch frequency developed by each corresponding design portion pitch length, or with other void depth frequencies. From an examination of three design portions extending across the width of the tire, the void depth of the intermediate void and the outer flanking void may be varied in any number of ways. For example, in FIGURES 5 and 6, the depth V of diamond-shaped sections 43 and 44 of the void for a particular design portion may be varied depending upon the dimension assigned for that particular position on a specially prepared Table III:

TABLE III

PITCH LENGTH SEQUENCE

| Rib 31 | Rib 32 | Rib 33 |
| --- | --- | --- |
| LSSMSLSML | MLSSMSLSM | MMLSSMSLS. |

VOID DEPTH SEQUENCE

| Void 44—SLMLMMMSL | 44—SMMLMSMLS | 43—MMSLSSMLL |
| --- | --- | --- |
| Void 43—SMSLSLLLM | 43—SMLLSLMLS | 44—SLLMSMMLS |

Figure 8:
FIGURE 8 is an enlarged sectional view taken on line 8—8 of FIGURE 4.

From Table III, in will be noted that the pitch lengths may be selected as in FIGURES 1 to 3 in random from a number of predetermined lengths, such as L, M, and S. Correspondingly, the void depth V may be varied in the same way, from the Table III, so that the depth of the voids will be varied as between themselves and in conjunction with the pitch length selected for the particular design portion 39 in which each is incorporated. Accordingly, each diamond-shaped void space 43 may have a dimension $V_L$, $V_M$, or $V_S$ and the corresponding pitch length having that void may be $P_S$, $P_M$, or $P_L$. From a further examination of FIGURE 7, it will be seen that diamond-shaped voids 44 in the flanking void section may be varied in depth V in much the same manner as voids 43. FIGURE 8 merely illustrates the configuration of the shoulder section of the tire and the void space therein which may either be of a constant depth, as shown, or varied.

The above may be better understood by relating specific dimensions of V and P from Table III onto the tread segment 30: Beginning from the lower left-hand corner of FIGURE 4 with rib 31, the pitch length will be $P_L$, the void 44 will have a depth $V_S$ and the void 43 a depth $V_S$. For the next assigned pitch length $P_S$, void 44 will be $V_L$ and void 43 will be $V_M$. The same may be applied from ribs 32 and 33, although it is to be noted that the values assigned will differ. Again, the numerical values assigned for each V and P designation shall be such as not to be divisible by any small whole number into one another.

In general, it will be evident that in describing the sequential order of the void depth variation and pitch length variation as being in random, as much selection is required in making and disposing the variations in random as would be necessary to form a predetermined pattern of variations as described with reference to FIGURES 1 to 3. Actually, in forming a random variation is it desirable to avoid continual repetition of a series of length and depth variations. Therefore, in general, the void depth may be varied in random sequence, together with the pitch length, both circumferentially and transversely of the tire tread and in a predetermined manner so as to avoid enrichment and combining of the pitch frequencies generated as the design portions strike the surface of the ground.

Accordingly, the present invention may be applied to any number of different tread designs and is not dependent upon the tread design for its ability to substantially reduce the noise energy generated in the tire. In addition, the present invention may be employed in combination with the formation of the design of the tread portion to still further reduce the noise energy generated. Furthermore, the void depth may be varied in relation to the variation of pitch length as described in FIGURES 1 to 3, or may assume a random variation and it will, of course, be understood that the selection therebetween can only be determined from the particular design characteristics of the tire. Actually, it will be understood that the variation in depth principle may be applied either to a series of voids, to a series of sipes or slits arranged in the ribs, or to a series of grooves running circumferentially around the tire, or to any continuing series of recessed portions in the tire wherein there is a tendency to develop objectionable noise, unless the depth and frequencies are closely controlled. In addition, the present invention is intended to include any variation in void depth, particularly variation of void depth along the length of the tread portion, whether closely controlled according to predetermined dimensions, or a predetermined series of dimensions, or not.

Thus, the basic principle of the present invention, together with various unique ways for applying this principle in the formation of a tire tread is considered to be novel, and it will be understood that while we have shown and described preferred embodiments of our invention, the invention may be otherwise embodied and practiced within the spirit of the invention, and as defined by the scope of the appendant claims.

What is claimed is:

1. In a tire, an outer road engaging tread portion defined by a plurality of longitudinal ribs divided by circumferentially extending grooves, each rib having a tread area formed into a series of design portions and voids arranged in sequence around the tire, each of said voids extending radially inwardly through the tread area, each void generating a particular pitch frequency according to its depth, the depth of each void being selected from a group of assigned dimensions with each dimension being selected to generate a differing non-additive pitch frequency in relation to the other dimensions, and the depth of adjacent voids being varied across the width and throughout the length of said tire so that adjacent void depths will generate non-additive pitch frequencies upon impact with the road surface.

2. In a tire according to claim 1, each of said voids having at least two depth levels and each depth level being selected from a group of assigned dimensions representative of differing, non-additive pitch frequencies, the depth levels of said voids being varied in accordance with the pitch frequencies generated by each level in order to generate non-additive frequencies within each void and between the voids when the tread areas engage the road surface.

3. In a tire according to claim 1 each design portion being further characterized by generating a particular pitch frequency according to its length, the length of each portion being selected from a group of assigned dimensions, each dimension being selected to generate a differing, non-additive pitch frequency both in relation to the design portion and void dimensions, the length of adjacent design portions being varied in order to prevent generation of additive pitch frequencies upon impact with the road surface.

4. In a tire according to claim 1 in which the voids are defined by transverse sipes.

5. In a tire according to claim 1 in which the void depths are varied in random sequential order throughout the length and across the width of said tire.

6. In a tire according to claim 3 in which the lengths of said design portions and depths of the voids are varied in random sequential order throughout the length of said tire.

7. A tire having an outer road engaging tire tread portion, said tread portion being defined by a plurality of longitudinal ribs divided by circumferentially extending grooves, each rib having a tread area comprising a series of tread design portions and voids arranged in sequence around said tire, said voids extending radially inwardly at spaced intervals through said tread area, each void generating a particular frequency according to its size, the size of each void being selected from a group of assigned dimensions, the dimensions being selected to generate differing, non-additive pitch frequencies in relation to one another, the size of voids in the tread areas simultaneously engaging the road surface being selected from different dimensions of those assigned in order to minimize the noise-energy generated as the tread areas engage the road surface.

8. A tire according to claim 7, each of said design portions being characterized by generating a pitch frequency according to its length, the length of each portion being selected from a group of assigned lengths each representative of a differing non-additive pitch frequency both in relation to the design portions and void sizes, the length of design portions simultaneously engaging the road surface being selected from different assigned lengths in order to minimize the noise-energy generated as said tread areas engage the road surface.

9. A tire according to claim 7 in which the voids for the tread areas simultaneously contacting the road surface are varied in size in random sequential order.

10. A tire according to claim 7 in which said voids are defined by transverse sipes at spaced intervals throughout the length of said tire dividing each rib into a series of design portions.

11. In a resilient tire, a tread portion comprising a plurality of rows of circumferential tread sections bounded by voids, each tread section having a plurality of ribs divided by intermediate voids, each rib being defined by a tread area formed into a continuous series of design portions, each design portion and each void generating a particular frequency according to their length and depth, respectively, the length of each portion and the depth of each void being selected from a group of assigned numerical values, the numerical values assigned being such as not to be multiples of a common number, the numerical values assigned to said design portions and voids being varied in non-repetitive order circumferentially and transversely of the tire to prevent combination of the pitch frequencies generated as the tread portion engages the road surface.

12. In a resilient tire according to claim 11, characterized by a plurality of reinforcement members projecting from the bottom of said voids, said reinforcement members varying in extent of projection from the voids in non-repetitive order throughout each tread section.

13. In a resilient tire, a tread construction comprising: a plurality of circumferentially extending, continuous ribs in parallel rows separated by longitudinally extending grooves into a plurality of tread sections, said ribs having tread areas incorporating a plurality of transverse slots spaced at predetermined intervals throughout the length thereof defining design portions therebetween, each design portion and each void generating a particular frequency according to their length and depth, respectively, the length of each portion and the depth of each void being selected from a group of assigned numerical values, the numerical values assigned being such as not to be multiples of a common number, the numerical values assigned to said design portions and voids being varied in non-repetitive order circumferentially and transversely of the tire to prevent combination of the pitch frequencies generated as the tread areas engage the road surface.

References Cited in the file of this patent

UNITED STATES PATENTS

| | | |
|---|---|---|
| 2,006,197 | Ewart et al. | June 25, 1935 |
| 2,706,509 | White | Apr. 19, 1955 |
| 2,708,957 | Constantakis et al. | May 24, 1955 |
| 2,756,797 | Campbell | July 31, 1956 |
| 2,756,798 | Palko et al. | July 31, 1956 |
| 2,808,867 | Buddenhagen et al. | Oct. 8, 1957 |
| 2,819,751 | Frary et al. | Jan. 14, 1958 |
| 2,850,066 | Nellen | Sept. 2, 1958 |
| 2,941,413 | Huber et al. | June 21, 1960 |